(12) United States Patent
Shteynberg et al.

(10) Patent No.: US 6,972,969 B1
(45) Date of Patent: Dec. 6, 2005

(54) SYSTEM AND METHOD FOR CONTROLLING CURRENT LIMIT WITH PRIMARY SIDE SENSING

(75) Inventors: Anatoly Shteynberg, San Jose, CA (US); Junjie Zheng, Campbell, CA (US); Harry Rodriguez, Gilroy, CA (US); Mark D. Telefus, Orinda, CA (US); Dongsheng Zhou, San Jose, CA (US)

(73) Assignee: iWatt, Inc., Los Gatos, CA (US)

( * ) Notice: Subject to any disclaimer, the term of this patent is extended or adjusted under 35 U.S.C. 154(b) by 0 days.

(21) Appl. No.: 10/922,661

(22) Filed: Aug. 19, 2004

(51) Int. Cl.$^7$ ............................................. H02M 3/335
(52) U.S. Cl. ............................... 363/21.12; 363/21.18; 363/97
(58) Field of Search .............................. 363/20, 21.01, 363/21.12, 21.13, 21.16, 21.18, 95, 97

(56) References Cited

U.S. PATENT DOCUMENTS

| | | | |
|---|---|---|---|
| 3,769,568 A | 10/1973 | Hamilton et al. | |
| 4,521,672 A | 6/1985 | Fronius | |
| 4,823,070 A | 4/1989 | Nelson | |
| 5,134,355 A | 7/1992 | Hastings | |
| 5,138,543 A | 8/1992 | Harm et al. | |
| 5,305,192 A | 4/1994 | Bonte et al. | |
| 5,325,282 A | 6/1994 | Bansard | |
| 5,438,499 A | 8/1995 | Bonte et al. | |
| 5,638,265 A | 6/1997 | Gabor | |
| 5,751,561 A | 5/1998 | Ho et al. | |
| 5,757,626 A | 5/1998 | Jovanovic et al. | |
| 5,841,643 A | 11/1998 | Schenkel | |
| 5,991,172 A | 11/1999 | Jovanovic et al. | |
| 6,038,144 A * | 3/2000 | Matsumoto et al. | ........... 363/19 |
| 6,038,146 A | 3/2000 | Luo et al. | |
| 6,043,633 A | 3/2000 | Lev et al. | |
| 6,215,288 B1 | 4/2001 | Ramsey et al. | |
| 6,275,018 B1 | 8/2001 | Telefus et al. | |
| 6,304,473 B1 | 10/2001 | Telefus et al. | |
| 6,324,079 B1 | 11/2001 | Collmeyer et al. | |
| 6,370,039 B1 | 4/2002 | Telefus | |
| 6,381,150 B2 | 4/2002 | Telefus | |
| 6,385,059 B1 | 5/2002 | Telefus et al. | |
| 6,396,722 B2 | 5/2002 | Lin | |
| 6,404,173 B1 | 6/2002 | Telefus | |
| 6,434,021 B1 | 8/2002 | Collmeyer et al. | |
| 6,611,439 B1 | 8/2003 | Yang et al. | |
| 6,621,255 B2 | 9/2003 | Telefus | |
| 6,646,897 B1 * | 11/2003 | Lomax et al. | ................. 363/97 |
| 6,721,192 B1 | 4/2004 | Yang et al. | |
| 6,853,563 B1 * | 2/2005 | Yang et al. | ............... 363/21.15 |
| 6,882,552 B2 * | 4/2005 | Telefus et al. | ................. 363/97 |
| 6,900,995 B2 * | 5/2005 | Muegge et al. | ........... 363/21.05 |

OTHER PUBLICATIONS

Bibian, Stephane et al., "Digital Control with Improved Performance for Boost Power Factor Correction Circuits," 16$^{th}$ Annual IEEE Applied Power Electronics Conference and Exposition, Mar. 2001, vol. 1, pp. 137-143.

(Continued)

*Primary Examiner*—Adolf Berhane
(74) *Attorney, Agent, or Firm*—Fenwick & West LLP

(57) ABSTRACT

A primary side sensing power control system and method that controls the current limit such that it is maintained within a small range for any acceptable input voltages and causes the output voltage of a PWM controller to drop as the output load increases when the current limit is reached.

14 Claims, 6 Drawing Sheets

OTHER PUBLICATIONS

Erickson, Robert et al., "Design of a Simple High-Power-Factor Rectifier Based on the Flyback Converter," Proceedings of IEEE Applied Power Electronics Conference 1990, Mar. 1990, pp. 792-801.

Murphy, P. et al., "Digital Control of Power Factor Correction," Power Electronics-Annual Seminar, 2003, pp. 341-347.

Zhang, Wanfeng et al., "A New Predictive Control Strategy for Power Factor Correction," 18$^{th}$ Annual IEEE Applied Power Electronics Conference and Exposition, Feb. 2003, vol. 1, pp. 403-409.

"NCP1651—Product Review, Single Stage Power Factor Controller," Apr. 2002, Rev. 1, Semiconductor Components Industries, LLC.

"NCP1651—Single Stage Power Factor Controller" [online], Oct. 2003, Rev. 5, ON Semiconductor Components Industries LLC, [retrieved Jan. 26, 2004]. Retrieved from Internet: <URL: http://www.onsemiconductor.com/pub/Collateral/NCP1651-D.pdf>.

"AND8124/D—90W, Universal Input, Single Stage, PFC Converter" [online], Dec. 2003, ON Semiconductor Components Industries LLC, [retrieved Jan. 26, 2004]. Retrieved from Internet: <URL: http://www.onsemiconductor.com/pub/Collateral/AND8124-D.pdf>.

"Unitrode UC1854, UC2854, UC3854 High Power Factor Preregulator," Jun. 1998, Texas Instruments Incorporated.

"Linear Technology LT1103/LT1105 Offline Switching Regulator" [online], retrieved on Apr. 12, 2004. Retrieved from Internet: <URL: http://www.linear.com/pdf/11035fd.pdf>.

"Linear Technology LT1725 General Purpose Isolated Flyback Controller" [online], retrieved on Apr. 12, 2004. Retrieved from Internet: <URL: http://www.linear.com/pdf/1725fd.pdf>.

* cited by examiner

SYSTEM AND METHOD FOR CONTROLLING CURRENT LIMIT WITH PRIMARY SIDE SENSING

RELATED APPLICATIONS

This application is related to U.S. patent application Ser. No. 10/610,977 filed on Jun. 30, 2003 by Shteynberg et al., and U.S. patent application Ser. No. 10/735,211, filed on Dec. 12, 2003 by Eason et al. which are both incorporated by reference herein in their entirety.

FIELD OF THE INVENTION

The present invention relates to a power supply and more particularly to pulse width modulation (PWM) controllers for limiting current with primary-side sensing and feedback.

BACKGROUND OF THE INVENTION

Pulse width modulation (PWM) is a conventional technology used for controlling power converters to achieve output power regulation. Conventional flyback power converters include a power stage for delivering electrical power from a power source to a load, a switch in the power stage that electrically couples or decouples the load to the power source, and a switch controller coupled to the switch for controlling the on-time and off-time of the switch. The on-time and off-time of the switch can be modified by this controller based upon a feedback signal representing the output power, output voltage or output current. The energy is stored in the gap of a transformer when a switch is on and is transferred to the load when the switch is off. Regulation can be accomplished by, among other things, measuring the output current (or voltage) and feeding that back to a primary side controller, which modifies the on-time and off-time of the switch accordingly.

In a power supply it is important to control the output power both by regulating the output within a tolerance level and by limiting the maximum output power. Ensuring a maximum power limit helps protect the power supply and connected circuits from damage. However, even in a circuit that is outputting constant power, the output current can increase to dangerous levels when the output voltage decreases. Accordingly, power supplies traditionally attempt to limit the maximum output current. Ideally, the maximum output current should not vary significantly in response to the input voltage. FIG. 2 is an illustration of an ideal constant current limit. $I_{MAX}$ represents the maximum steady state output current at normal load condition at which the performance of the power supply is within a specified tolerance level. $I_{LIM}$ represents the limited maximum output current to be delivered by the power supply at an over-load condition when the performance of power supply is degraded. Generally, the limited maximum output current $I_{LIM}$ is limited to a specified percentage, such as 130% of normal maximum output current $I_{MAX}$, to avoid damaging the power supply. During the variation of the output current from 0 to $I_{MAX}$, the output voltage is kept within the tolerance level. From the $I_{MAX}$ to $I_{LIM}$, the output voltage is over the tolerance level and is under-regulated. At the moment the output current exceeds $I_{LIM}$, the output voltage begins to drop linearly. With the dropping of output voltage, the output current is kept at $I_{LIM}$ until the output voltage drops below a shutdown voltage that then turns off the controller. No conventional primary-side sensing systems perform close to this ideal.

One conventional power supply system involves a flyback power converter that senses the output voltage directly from the secondary side of the transformer (secondary side sensing). FIG. 1 is an illustration of such a conventional secondary side sensing circuit.

FIG. 1 illustrates a traditional flyback power supply. A capacitor 120 connected to a PWM controller 100 is charged via a resistor 110. The PWM controller 100 is started up once its supply voltage Vcc is higher than the start-threshold voltage. When the PWM controller 100 starts to operate, it outputs a PWM signal to drive a MOSFET 103 and a transformer 104. Meanwhile its supply voltage $V_{CC}$ is supplied by the auxiliary winding of the transformer 104 through a rectifier 130. A resistor 140 converts the switching current of the transformer 104 into voltage signal for PWM control and over-power protection. The feedback voltage $V_{FB}$ is derived from the output of an optical-coupler 150. The output voltage conducted through a resistor 190 and a Zener voltage of the Zener diode 180 drive the input of the optical-coupler 150 to form the feedback-loop. Through the PWM controller 100 the voltage $V_{FB}$ determines the on-time $(t_{ON})$ of the PWM signal that determines the output power. A transistor 160 that is associated with a current-sense resistor 170 determines the maximum output current. As the output current increases and the voltage across the current-sense resistor 170 exceeds the junction voltage of the transistor 160 such as 0.7 V, the transistor 160 is turned on to reduce the on-time of the PWM signal by decreasing the feedback voltage $V_{FB}$ and thus clamping the output current of the power supply as a constant.

The circuit in FIG. 1 has the benefit of being substantially precise with respect to power regulation while controlling the maximum current. However, a problem with this type of circuit is that significant power is lost on the sense resistor 170 that decreases the efficiency of the circuit. In addition, such systems typically need to be trimmed (adjusted) individually to achieve proper functionality. Such individual adjustments are time consuming and expensive.

Another conventional system involves a flyback power converter that limits power using primary side sensing. FIG. 3 is an illustration of a conventional circuit that limits power output using primary side sensing.

In FIG. 3, a conventional PWM power supply circuit uses a PWM controller 100. The operation of PWM-control begins by charging capacitor 290 via a serial start-up resistor 222 when the power is turned on until the VCC reaches the threshold voltage, and then a PWM controller 100 starts to output a PWM signal and drive the entire power supply. After the start-up, the supply voltage VCC is provided from the auxiliary bias winding of the transformer 400 through a rectifier 330. The resistor 230 that is connected serially with the power MOSFET 300 determines the maximum output power of the power supply. This technique connects the voltage of resistor 230 to the current-sense input (Vs) of the PWM controller 100. If the voltage Vs is greater than the maximum current-sense voltage, then the PWM controller 100 disables the output of its OUT pin to restrict the maximum power output of the power supply.

The system set forth in FIG. 3, and similar systems, are based on equations (1) and (2).

$$P_{in} = \frac{V_{in}^2}{2L_M} \times \frac{t_{on}^2}{T_s} \qquad (1)$$

-continued $$I_P = \frac{V_{in}}{L_M} \times t_{on} \quad (2)$$

Where Ip is the primary switch peak current, $V_{in}$ is the line input AC RMS voltage, $L_M$ is the primary magnetizing inductance, $t_{on}$ is the on-time of the switch. In conventional solutions, the switching period $T_S$ is fixed and the maximum on-time, $t_{on(max)}$ is limited by the voltage sensed across a sense resistor 230 which senses the primary switch peak current Ip, to further limit the output power. For the specified sense resistor 230, the maximum on-time is inversely proportional to the line voltage that means that the limited maximum power differs with the variation of the line voltage. To compensate for the variations in the line voltage, the feed-forward resistor 220 is set to compensate for the sensing voltage Vs.

This primary side power converter is less accurate than the secondary side sensing described above and, therefore, only provides an approximate power limit control. Additionally, the circuit in FIG. 3 does not adequately control the output current since the circuit has insufficient information about the output voltage. And also, this method is constrained for the fixed switch period.

FIG. 4 is an illustration that approximates the current response in the circuits illustrated in FIG. 1 and FIG. 3. In FIG. 4 the current limit of the circuit varies significantly based upon the input voltage. For example, the current limit when the input voltage is 90 volts is $I_{lim\_90}$. In contrast the current limit when the input is 264 volts $I_{lim\_264}$. As seen in FIG. 4, the current limit in such conventional systems varies significantly as the input voltage varies.

What is needed is a primary side sensing power control system and method that (1) controls the current limit such that it is maintained within a small range for any acceptable input voltage, e.g., 90 volts to 264 volts RMS, and (2) causes the output voltage of a PWM controller to drop as the output load increases when the current limit is reached.

SUMMARY OF THE INVENTION

The present invention is a primary side sensing power control system and method along with a squared feed-forward signal to control the current limit such that it is maintained within a small range for any acceptable input voltages, e.g., 90 volts to 264 volts RMS, and causes the output voltage of a PWM controller to drop as the output load increases when the current limit is reached.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION OF THE INVENTION

A preferred embodiment of the present invention is now described with reference to the figures where like reference numbers indicate identical or functionally similar elements. Also in the figures, the left most digits of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

The language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth below in the claims.

As described above, the present invention is a system and method that (1) controls the current limit such that it is maintained within a small range for any acceptable input voltages, e.g., 90 volts to 264 volts RMS, and (2) causes the output voltage of a PWM controller to drop as the output load increases when the current limit is reached. The present invention accomplishes this using primary side sensing of the output voltage and using this sensed voltage to adjust the duty cycle. The switching period can be fixed or can vary. The sensing of the output voltage is acquired precisely every cycle and is used to adjust the on-time and off-times of the switch. A variation in the input line voltage is compensated using a line-squared-feed-forward approach that results in a stable and substantially constant current limit.

Figure 1:
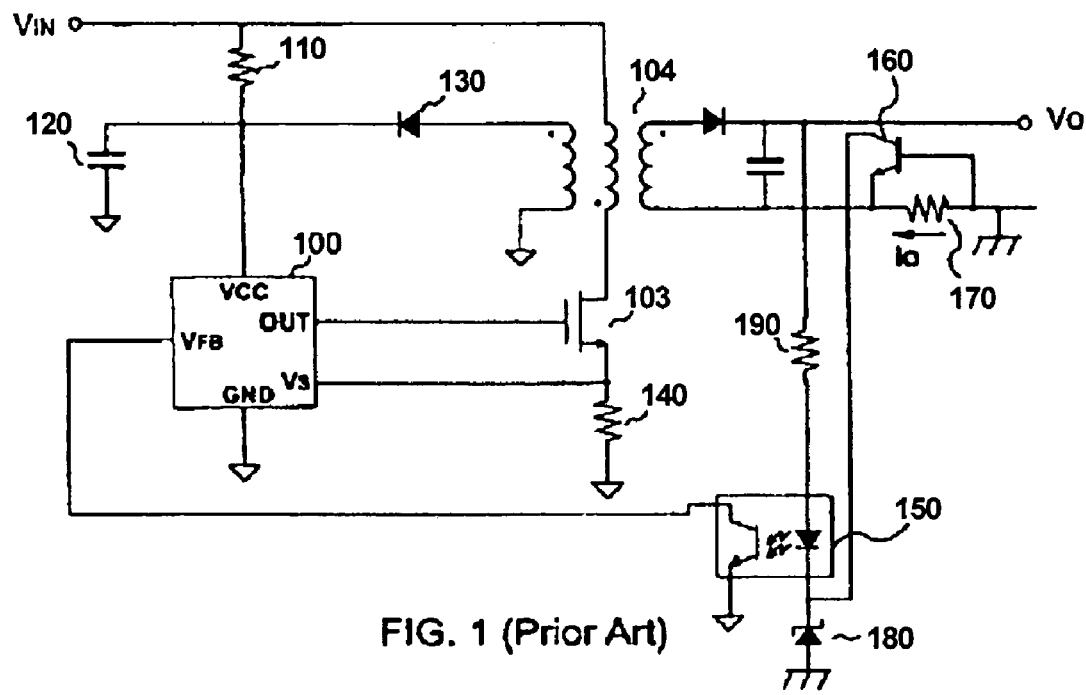
FIG. 1 is an illustration of a conventional secondary side sensing circuit.
Figure 2:
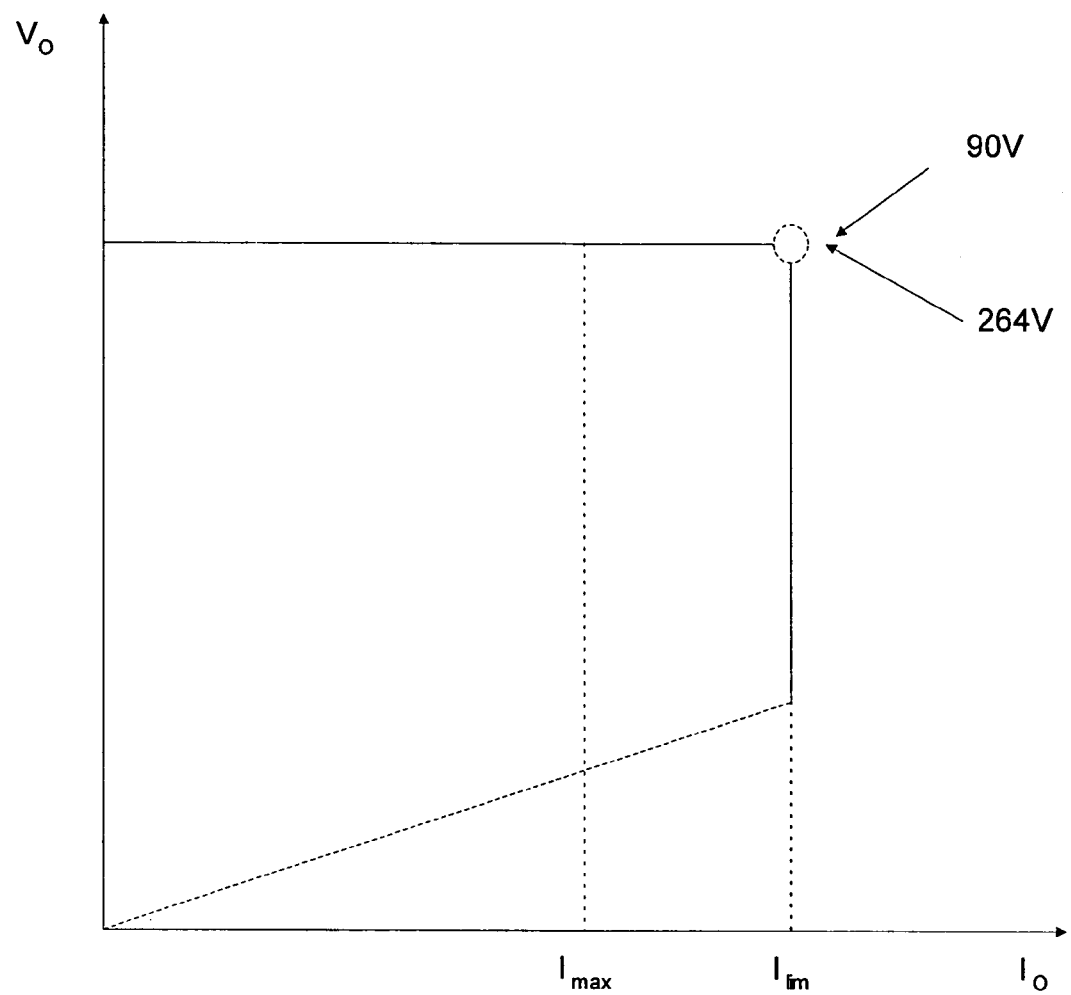
FIG. 2 is an illustration of an ideal constant current limit.
Figure 3:
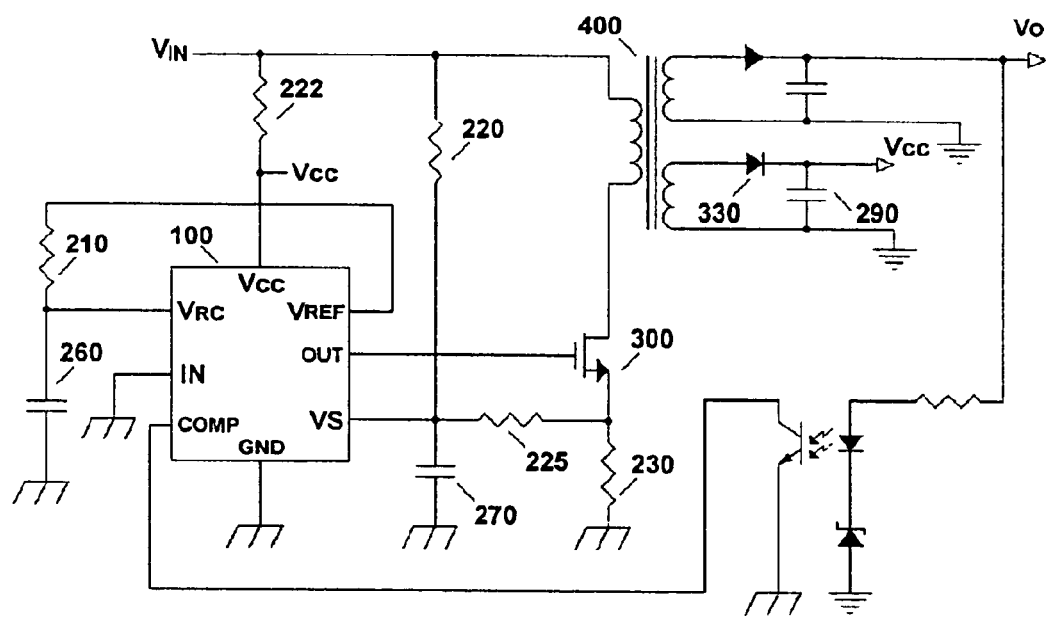
FIG. 3 is an illustration of a conventional circuit that limits power output using primary side sensing.
Figure 4:
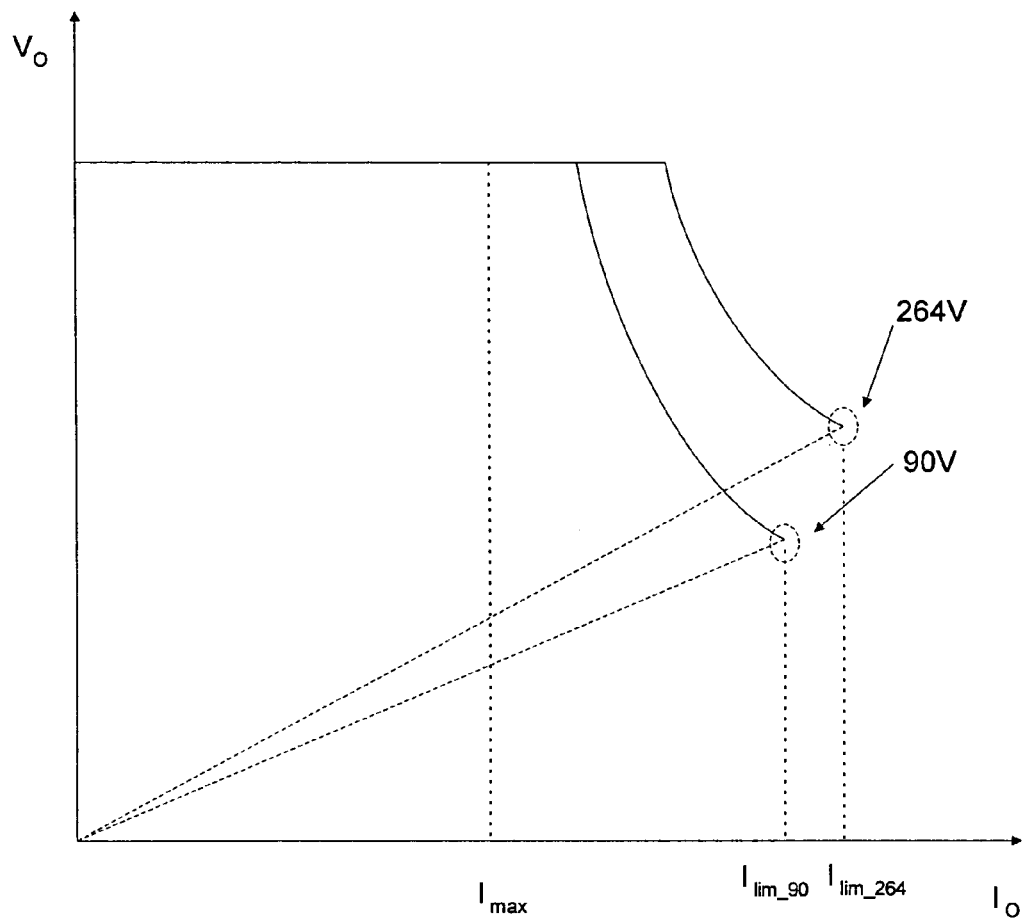
FIG. 4 is an illustration that approximates the current response in the circuits illustrated in FIG. 1 and FIG. 3.
Figure 5:
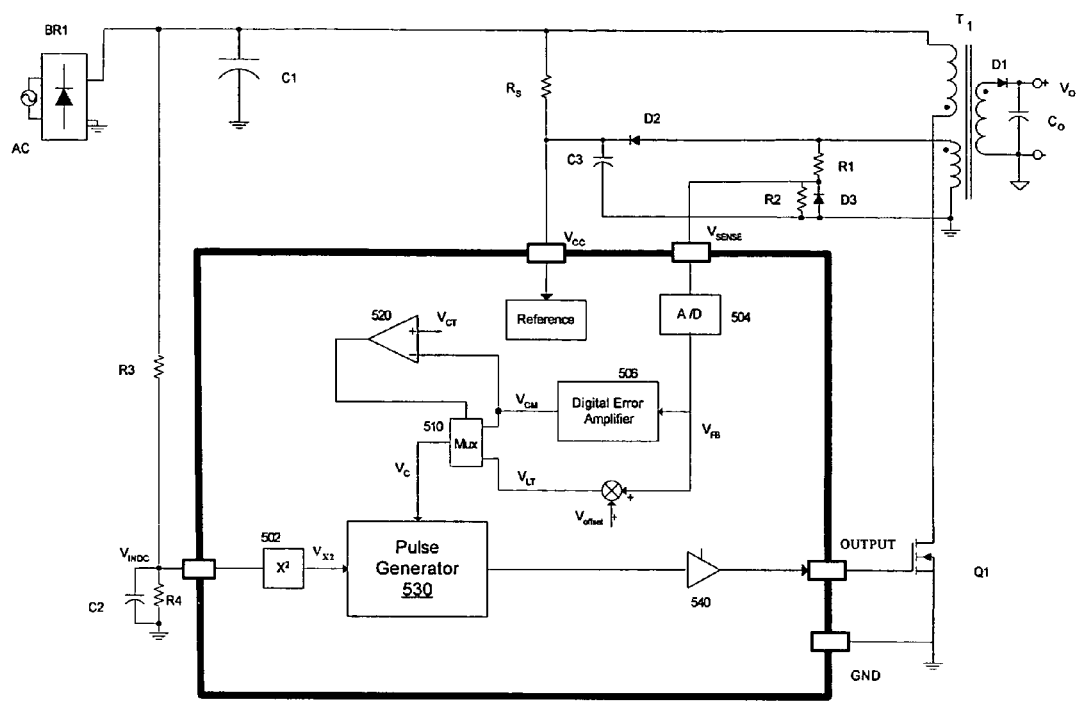
FIG. 5 is an illustration of a primary side sensing power converter circuit according to one embodiment of the present invention.

FIG. 5 is an illustration of one embodiment of the present invention. A rectifier, e.g., bridge diode (BR1), receives an AC signal that typically has a voltage that ranges from 90V to 264V and outputs a rectified signal. Capacitor C1 acts as a high frequency filter for the output of the BR1 that is coupled to a primary side winding of a transformer T1. Transformer T1 includes a primary and auxiliary winding on the primary side and a secondary winding on the secondary (output) side. In this embodiment, conventional circuitry, e.g., rectifying diodes D2, D3 and filter C3, R1, R2 can be used to sense the voltage ($V_{SENSE}$) on the auxiliary winding (primary side). The DC input voltage ($V_{INDC}$) is identified by using, for example, sense resistor R3 in combination with a low frequency filter (C2/R4). The secondary winding is coupled to an output rectifier diode D1 and output filter C0.

In a flyback type power converter that operates at discontinuous conduction mode, the output power $P_O$ can be expressed as:

$$P_o = \frac{V_{in}^2}{2L_M} \times \frac{t_{on}^2}{T_s} \times \eta \qquad (3)$$

$$I_o = \frac{P_o}{V_o} = \frac{V_{in}^2}{2L_M} \frac{k}{V_o} \eta \qquad (4)$$

Where $\eta$ is power efficiency ($P_o/P_{in}$) and $$k = \frac{t_{on}^2}{T_S} \qquad (5)$$

It can be seen, for given input line voltage, the output power is directly proportional to the k, which is determined by the on-time and the switching period. This means that the k is substantially a constant for a particular output power. Hence, the output current can be limited based upon the value of the output voltage. The current can be controlled at a constant level based upon the sensed output voltage. The on-time $t_{on}$ and switching period $T_S$ are generated by the pulse generator 530. Both of them can be fixed or modulated to keep k at constant level based upon the output current and the input line voltage. One technique for accomplishing this is set forth in U.S. patent application Ser. No. 10/610,977, referenced above.

With reference to FIG. 5, the sense voltage, $V_{sense}$, is directly proportional to the output voltage as expressed by Equation (6).

$$V_O = \frac{N_O}{N_{aux}} \times (V_O + V_F) \times k_d \qquad (6)$$

Where $N_O$ is the turns of output voltage winding, $N_{aux}$ is the turns of auxiliary winding, $V_F$ is the forward voltage drop across diode D1. $k_d$ is the scale factor of $V_{sense}$ to Vo. It can be expressed as set forth in equation (7).

$$k_d = \frac{V_{sense}}{V_O} = \frac{R2}{R1 + R2} \qquad (7)$$

A conventional analog-to-digital (A/D) converter 504 generates the digital feedback voltage signal $V_{FB}$ from the $V_{sense}$ signal. The feedback voltage signal is directly proportional to the output voltage under any condition cycle by cycle.

The $V_{FB}$ is sent to the input of a conventional digital error amplifier 506, which generates an error feedback signal $V_{CM}$. In one embodiment of the present invention, the $V_{CM}$ signal is the proportional-integral (PI) function, as per equation (8), of the normal (nominal) feedback voltage level $V_{FB\_NOM}$ and the feedback voltage which represents the output voltage.

$$V_{CM} = fx(V_{FB\_NOM} - V_{FB}) \qquad (8)$$

When the output current is increased, the feedback voltage $V_{FB}$ is decreased corresponding to the drop of output voltage. This results in an increase in $V_{CM}$. The error voltage signal $V_{CM}$ is received by the pulse generator 530 as the control signal $V_C$ and is used by the pulse generator 530 to control the on-time ($t_{on}$) and the switch period $T_S$, to achieve a constant k. Thereafter, the on-time can be increased to deliver more power to output until the output voltage is within the tolerance level. The deviation of the on-time $\Delta t_{on}$, is inversely proportional to the deviation of feedback voltage $\Delta V_{FB}$. Accordingly, when the output current is less than the current limit (as represented by $V_{CM}$) this loop is a negative feedback loop. One embodiment of the pulse generator 530 is described in detail in U.S. patent application Ser. No. 10/610,977 (see description of current waveform synthesizer). For a given output voltage the error feedback signal $V_{CM}$ can be used to closely estimate the output current.

The $V_{CM}$ signal is sent to a multiplexor as both an input and as a control signal. The second input to the multiplexor is the current limit voltage $V_{LT}$, described below.

The multiplexor is controlled by the current limit block 520 that sets the control voltage signal $V_C$ equal to the error voltage signal $V_{CM}$ when the value of the error voltage signal corresponds to the output current being less than the preset voltage signal $V_{CT}$ that corresponds to the limited output current $I_{LIM}$. Otherwise, when the output current limit exceeds its limit, $I_{LIM}$, the control voltage signal $V_C$ is set to the current limit voltage signal $V_{LT}$.

In general, the current limit voltage $V_{LT}$ is equal to the feedback voltage increased by an offset. For example, in one embodiment the current limit voltage is defined as in Equation (9).

$$V_{LT} = V_{FB} + V_{offset} \qquad (9)$$

In one embodiment, the value of the offset voltage, $V_{offset}$, is determined by Equation (10). Other values for the offset voltage can also be used.

$$V_{offset} = V_{CT} - V_{FB\_NOM} \qquad (10)$$

Where $V_{FB\_NOM}$ is the normal output voltage during the output current variation from 0 to $I_{MAX}$.

The loop created when the output current limit is reached is a positive feedback loop. At the moment the output current reaches the limited current $I_{LIM}$, the control voltage Vc is set equal to $V_{LT}$. When the output current is increased by $\Delta I_{LMT}$, the feedback voltage decreases by $\Delta V_{FB}$. When the control voltage Vc decreases the on-time is reduced. So the power requested by the increased output current is reduced which results in having the output voltage drop linearly. Therefore, the system achieves a substantially constant output current limit with varying output voltage.

It can be seen in Equation (4) that for the given limited output power, the k which represents the on-time and the switching period is inversely proportional to the square of the RMS value of line voltage $V_{in}$. The Line Square feedforward block 502 of the present invention receives the DC input voltage $V_{INDC}$ and squares this signal to generate the squared feed-forward signal $V_{X2}$ in order to permit the pulse generator 530 to account for this factor in determining the on-time $t_{on}$ and the switch period $T_S$. The pulse generator receives the squared feed-forward signal $V_{X2}$ and the control signal $V_C$ and modifies the on-time and the switch period of the switch Q1. So it results that the energy to be delivered to the output is identified at low line and high line voltage. Consequently the limited maximum output current $I_{LIM}$ is identified. One embodiment of the Pulse Generator 530 is set forth in related to U.S. patent application Ser. No. 10/610, 977, referenced above.

Figure 6:
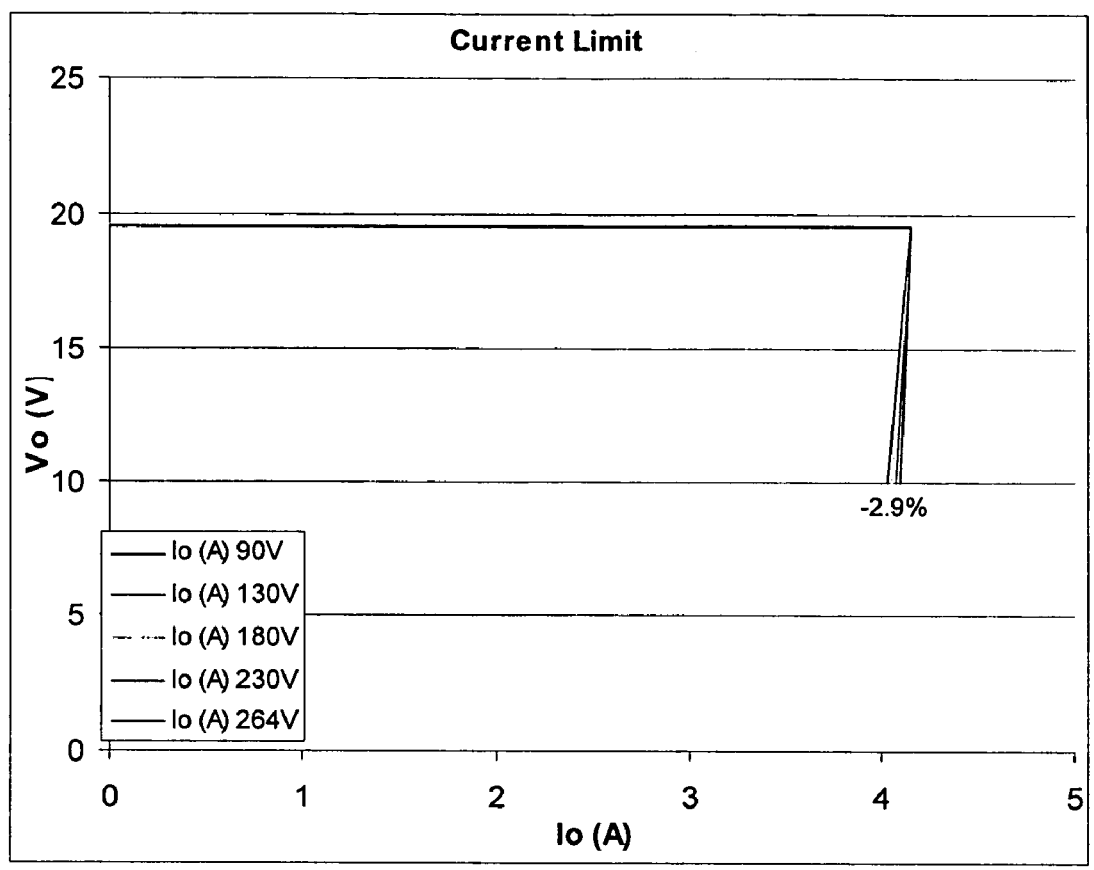
FIG. 6 is a graph showing experimental results for one embodiment of the present invention.

FIG. 6 is a graph showing experimental results for one embodiment of the present invention. The value of the output current Io varies by only 2.9 percent over the range of input voltages of 90 volts to 264 volts which is a significant improvement over conventional systems.

What is claimed is:

1. A method for limiting an output current of a power supply having a primary and secondary side using pulse width modulation comprising the steps of:
   generating a sense voltage signal on the primary side that is proportional to an output voltage signal on the secondary side;
   generating a digital feedback voltage signal from a sense voltage signal;
   generating an error feedback signal that is a function of a difference between said digital feedback voltage signal and a nominal feedback voltage signal,
   generating a control signal wherein said control signal corresponds to said error feedback signal when an output current does not exceed an output current limit, and wherein said control signal corresponds to said digital feedback voltage that is offset by a first voltage when said output current exceeds the output current limit;
   generating a squared feed-forward signal that is proportional to the square of a direct current input voltage signal; and
   generating an on-time signal for pulse width modulation based upon said control signal and said squared feed-forward signal.

2. The method of claim 1, further comprising the step of:
   modifying at least one of said on-time and a switching period to maintain a substantially constant current limit for any acceptable input voltage.

3. The method of claim 2, wherein a ratio of a square of said on-time to said switching period is maintained as substantially constant for any acceptable input voltage.

4. The method of claim 1, wherein said on-time signal controls the on-time of a switch wherein said on-time is reduced and said output voltage is reduced when said output current exceeds said output current limit.

5. A system for limiting an output current of a power supply having a primary and secondary side using pulse width modulation comprising:
   generating means for generating a sense voltage signal on the primary side that is proportional to an output voltage on the secondary side;
   feedback means for generating a digital feedback voltage signal from a sense voltage signal;
   error means for generating an error feedback signal that is a function of a difference between said digital feedback voltage signal and a nominal feedback voltage signal,
   control means for generating a control signal wherein said control signal corresponds to said error feedback signal when an output current does not exceed an output current limit, and wherein said control signal corresponds to said digital feedback voltage that is offset by a first voltage when said output current exceeds the output current limit;
   squared feed-forward means for generating a squared feed-forward signal that is proportional to the square of a direct current input voltage signal; and
   pulse generation means for generating an on-time signal for pulse width modulation based upon said control signal and said squared feed-forward signal.

6. The system of claim 5, wherein said pulse generation means modifies at least one of said on-time and a switching period to maintain a substantially constant current limit for any acceptable input voltage.

7. The system of claim 6, wherein a ratio of a square of said on-time to said switching period is maintained as substantially constant for any acceptable input voltage.

8. The system of claim 5, wherein said on-time signal controls the on-time of a switch wherein said on-time is reduced and said output voltage is reduced when said output current exceeds said output current limit.

9. A pulse width modulation controller for controlling a current limit within a small range in a power supply having a primary side and a secondary side, comprising:
   a sense voltage unit for generating a sense voltage on the primary side that is proportional to an output voltage on the secondary side;
   a converter for generating a digital feedback voltage signal from a sense voltage signal;
   an error amplifier, for generating an error feedback signal that is a function of a difference between said digital feedback voltage signal and a nominal feedback voltage signal,
   a control signal generator for generating a control signal wherein said control signal corresponds to said error feedback signal when an output current does not exceed an output current limit, and wherein said control signal corresponds to said digital feedback voltage that is offset by a first voltage when said output current exceeds the output current limit;
   a squared feed-forward unit, that receives a direct current input voltage signal and generates a squared feed-forward signal that is proportional to the square of said direct current input voltage signal;
   a pulse generator for receiving said control signal and said squared feed-forward signal and generates an on-time signal for pulse width modulation based upon said control signal and said squared feed-forward signal.

10. The controller of claim 9, further comprising:
    a filter for filtering an input voltage signal to generate said direct current input voltage signal.

11. The controller of claim 10 wherein said filter is a high pass filter.

12. The controller of claim 9, wherein said pulse generator modifies at least one of said on-time and a switching period to maintain a substantially constant current limit for any acceptable input voltage.

13. The controller of claim 12, wherein a ratio of a square of said on-time to said switching period is maintained as substantially constant for any acceptable input voltage.

14. The controller of claim 9, wherein said on-time signal controls the on-time of a switch wherein said on-time is reduced and said output voltage is reduced when said output current exceeds said output current limit.

* * * * *